United States Patent
Lee et al.

(10) Patent No.: US 7,471,890 B2
(45) Date of Patent: Dec. 30, 2008

(54) MOBILE COMMUNICATION TERMINAL WITH DUAL-DISPLAY UNIT HAVING FUNCTION OF EDITING CAPTURED IMAGE AND METHOD THEREOF

(75) Inventors: Sang-Hyuck Lee, Seoul (KR); Yeon-Woo Park, Seoul (KR); Jee-Young Cheon, Daegu (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 11/502,461

(22) Filed: Aug. 11, 2006

(65) Prior Publication Data

US 2007/0035616 A1      Feb. 15, 2007

(30) Foreign Application Priority Data

Aug. 12, 2005    (KR) ................. 10-2005-0074153
Aug. 24, 2005    (KR) ................. 10-1005-0077855

(51) Int. Cl.
   *G03B 17/18*      (2006.01)
(52) U.S. Cl. ...................... 396/287; 455/566
(58) Field of Classification Search ................. 396/287; 455/566
   See application file for complete search history.

(56) References Cited

U.S. PATENT DOCUMENTS

| | | | |
|---|---|---|---|
| 6,943,841 B2 * | 9/2005 | Miyake et al. | ......... 348/333.05 |
| 2001/0008412 A1 | 7/2001 | Ando et al. | |
| 2002/0142810 A1 | 10/2002 | Kawasaki et al. | |
| 2003/0218682 A1 | 11/2003 | Lim et al. | |
| 2004/0092284 A1* | 5/2004 | Satoh et al. | ............... 455/550.1 |
| 2005/0041132 A1* | 2/2005 | Juen et al. | ............... 348/333.12 |
| 2006/0052146 A1* | 3/2006 | Ou | ........................... 455/575.2 |
| 2007/0275762 A1* | 11/2007 | Aaltone et al. | ............... 455/566 |

FOREIGN PATENT DOCUMENTS

| | | |
|---|---|---|
| EP | 1 111 919 A2 | 6/2001 |
| EP | 1 455 529 A1 | 9/2004 |
| JP | 2003-298884 A | 10/2003 |
| KR | 10-2004-0055141 A | 6/2004 |
| KR | 10-2005-0074034 A | 7/2005 |

OTHER PUBLICATIONS

NTT DoCoMo, "NTT DoCoMo unveils 'i-shot' service for new camera-equipped mobile phone model", May 28, 2002, (whole document).

* cited by examiner

*Primary Examiner*—W. B. Perkey
*Assistant Examiner*—Warren K Fenwick
(74) *Attorney, Agent, or Firm*—Birch, Stewart, Kolasch & Birch, LLP

(57) ABSTRACT

A mobile communication terminal with a camera and a dual-display unit, whereby, in an image capturing mode, a first display unit displays an image of a subject received through a camera in real time and a second display unit displays a still image of the subject captured according to an image capture command signal received from a user, and in an image editing mode, when one of at least two or more images displayed on the first display unit is selected, the selected image is displayed on the second display unit, and at the same time, when a certain function icon provided to the first display nit is selected, a function allocated to the selected function icon is executed. An image of a camera preview and a captured image are displayed on each different display unit, so a user can capture a moment an image is to be captured and check the recently captured image by naked eyes, enhancing user convenience and providing fun to users.

23 Claims, 8 Drawing Sheets

MOBILE COMMUNICATION TERMINAL WITH DUAL-DISPLAY UNIT HAVING FUNCTION OF EDITING CAPTURED IMAGE AND METHOD THEREOF

BACKGROUND OF THE INVENTION

1. Field of the Invention

The present invention relates to a mobile communication terminal having a dual-display unit and, more particularly, to a mobile communication terminal capable of displaying a preview image of a camera and a captured image in each different display unit, implementing displaying of an image and displaying for editing or magnifying an image on each separate display unit, and having an image editing function for providing user interface by using a touch screen, and its method.

2. Description of the Related Art

Recently, in line with the remarkable development of mobile communication and information industry technology, mobile communication terminals having a single display unit are being replaced by mobile communication terminals with two display units.

Two display units can be provided in various manners, and in a related art, typically, a main display unit has a relatively large screen and a sub-display unit has a relatively small screen. The sub-display unit generally displays simple information such as a date, a clock and short text, but not image information.

The recently marketed mobile communication terminals are mostly equipped with a camera, and mobile terminals are advancing from a camera supporting low resolution to a camera supporting high resolution. Accordingly, a processor for processing a captured image with high resolution is mounted and wider screen is provided to manage various images in mobile terminals.

However, in case of a mobile terminal having a single display unit, disadvantageously, a user should move each menu to capture an image with the camera and check a captured image, and so does the terminal having two display units that provides a sub-screen.

Currently, mobile communication terminals are increasingly providing diverse functions of, for example, freely handling multimedia data such as a still image or video. However, the functions of displaying images, editing images and magnifying images through the mobile communication terminal are not enough to meet the users' demand, and thus, development and providing of mobile communication terminals that may satisfy users are on demand.

In addition, in case of the mobile terminal having a single display unit, while a user is editing an image, if the user needs to compare the edited image with its original image, he/she should the edited image and then fetches the original image, and this problem is also the same with the mobile terminal having the two display units with the sub-screen providing only simple information.

Meanwhile, with the mobile terminal having the two display units, users need more convenient user interface in addition to the existing keypad type input unit in order to quickly obtain various information, perform inter-screen movement, and process different information in each screen.

SUMMARY OF THE INVENTION

One exemplary feature of the present invention is to provide a mobile communication terminal with a dual-display unit having a function of an image editing function capable of implementing displaying of a camera preview image and displaying of a captured image on each different display unit, and also capable of displaying the image and displaying an edited image or magnified image on each different display unit, and its method Another exemplary feature of the present invention is to provide a mobile communication terminal with a dual-display unit having an image editing function capable of allowing a user to conveniently edit or display an image on each different display unit by mounting a touch screen as a user interface on the different display units.

One aspect of the present invention involves the recognition by the present inventors of the drawbacks in the related art, as explained above. Based upon such recognition, improvements to the Mobile Communication Terminal with dual-display equipment having an image editing function for captured image can be achieved according to the present invention.

Certain features that may be part of dual-display equipment having image editing functions will not be described in much detail, merely to prevent the characteristics of the present invention from being obscured. However, such additional features may also be part of the dual-display equipment method and apparatus of the present invention, as would be understood by those skilled in the art.

To implement at least the above features in whole or in parts, the present invention provides a mobile communication terminal with a camera and a dual-display unit, whereby, in an image capturing mode, a first display unit displays an image of a subject received through a camera in real time and a second display unit displays a still image of the subject captured according to an image capture command signal received from a user, and in an image editing mode, when one of at least two or more images displayed on the first display unit is selected, the selected image is displayed on the second display unit, and at the same time, when a certain function icon provided to the first display nit is selected, a function allocated to the selected function icon is executed.

Hereafter, the term "terminal" is intended to refer to and cover various types of communication devices that support mobility (or may be fixed) and allows communication of information via wired and/or wireless interfaces. Examples may include mobile stations, user equipment (UE), handsets, PDAs, etc. Also, other types of image capture devices, not only cameras, may also be used as well in order to provide real-time scene in the image capturing mode.

To implement at least the above features in whole or in parts, the present invention also provides a method for dually displaying captured images by using a mobile communication terminal in an image capturing mode including: displaying an image of a subject received through a camera on a first display unit in real time by using the mobile terminal with a camera (a); obtaining a still image of the subject according to an image capturing command signal received from a user, and storing it in a certain memory (b); and displaying the captured still image on a second display unit (c).

In the step (c), the still image captured in the step (b) can be displayed in a thumbnail type in the image capturing order or the most recently captured still image can be displayed, according to pre-set options.

The method for dually displaying captured images by using a mobile communication terminal in an image editing mode including: displaying at least one or more images on the first display unit (d); selecting one of the images displayed on the first display unit (e); displaying the selected image on the second display unit (f); selecting a certain function icon provided on the first display unit (g); and executing a function allocated to the selected function icon (h).

At least one or more of the first and second display units include a touch screen as a user interface, and the steps (e) and (g) are performed through the touch screen.

The function icon indicates an image editing, and the function may provide various editing tools for editing the selected image.

The function icon indicates an image magnifying, and the function may magnify the selected image and display the magnified image.

The method for dually displaying captured images by using a mobile communication terminal with a first display unit including a touch screen, including: displaying at least one or more images on the first display unit (d); selecting one of the images displayed on the first display unit and drag-and-dropping it to a certain function icon provided on the first display unit (e); displaying the selected image on the separate second display unit (f); and executing a function allocated to the drag-and-dropped function icon.

Herein, the step (f) can be performed immediately when the image is selected or immediately when the image is drag-and-dropped to the certain function icon.

To implement at least the above features in whole or in parts, the present invention also provides a mobile communication terminal having a function of dually displaying an image captured by a camera, including: a key input unit for receiving various instructions from a user; a controller for outputting a first control signal for displaying an image of a subject received through the camera in real time and a second control signal for receiving an image capture command signal from the key input unit and displaying a captured still image of the subject; a first display unit for displaying the image of the subject in real time according to the first control signal; and a second display unit for displaying the still image according to the second control signal.

To implement at least the above features in whole or in parts, the present invention also provides a mobile communication terminal with a dual-display unit having an image editing function including: a first display unit for displaying at least one or more images; a controller for receiving a select signal with respect to one of the images displayed on the first display unit and outputting a first control signal for displaying the selected image; and a second display unit for displaying the selected image according to the first control signal.

Herein, the controller may provide a certain function icon to the first display unit, and when a select signal with respect to the function icon is received, the controller may performing an operation of outputting a second control signal to execute a function allocated to the selected function icon.

At least one or more of the first and second display units includes a user interface (i.e., touch screen).

The function icon may indicate an image editing, and the second control signal may provide various editing tools for editing the selected image to the first display unit and edit the selected image according to an image editing tool select signal received from the user.

The function icon may be an icon for an image magnifying, and the second control signal may provide an indicator that moves according to a movement command signal received from the user to the first display unit and display an image magnified at a certain magnification centering on a position of the indicator according to a movement of the indicator.

To implement at least the above features in whole or in parts, the present invention also provides a mobile communication terminal with a dual-display unit having an image editing function including: a first display unit for displaying at least one or more images; a controller for outputting a first control signal for displaying a selected image, when one of the images displayed on the first display unit is selected and drag-and-dropped to a certain function icon provided on the first display unit, and a second control signal for executing a function allocated to the drag-and-dropped function icon; and a second display unit for displaying the selected image according to the first control signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims. In describing the present invention, if a detailed explanation for a related known function or construction is considered to unnecessarily divert the gist of the present invention, such explanation has been omitted but would be understood by those skilled in the art.

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1A:
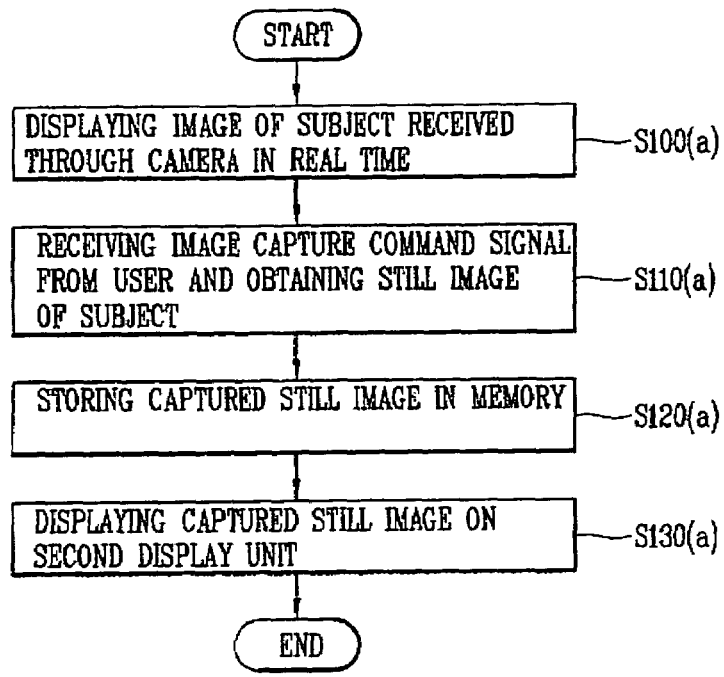
FIGS. 1(a) and 1(b) are flow charts illustrating the processes of a method for dually displaying captured images and editing images using a mobile communication terminal with a dual-display unit according to a first embodiment of the present invention.

FIG. 1a is a flow chart illustrating processes of a method for dually displaying a captured image in an image capturing mode using a mobile communication terminal according to a first exemplary embodiment of the present invention. The method for dually displaying a captured image by using a mobile terminal according to the first exemplary embodiment of the present invention will now be described.

The mobile terminal according to the present invention includes a camera and first and second display units for displaying various information. Preferably, at least one of the first and second display units includes a touch screen as a user interface.

First, an image of a subject received through a camera is displayed on the first display unit in real time (step S100a). Namely, a user can preview an image of the subject received through the camera on the first display or on the both first and second display units.

Thereafter, an image capturing instruction signal is received from the user, a still image of the subject is obtained (step S110a), and the captured still image is stored in a certain memory (step S120a). In this case, the user can obtain the still image of the subject by pressing an image capture button of the mobile terminal, or alternatively, the user can obtain the still image of the subject by pressing a touch screen of the second display unit. The image capture button can be a keypad button or a hot button of the related art mobile terminal, and the obtained still image can be stored in the memory of the terminal according to a user selection.

Subsequently, the captured still image is displayed on the second display unit (step S130a). Herein, the captured still image can be displayed in a thumbnail type in the capturing order or only the most recently captured still image can be displayed according to a user setting or an option set as default.

Figure 1B:
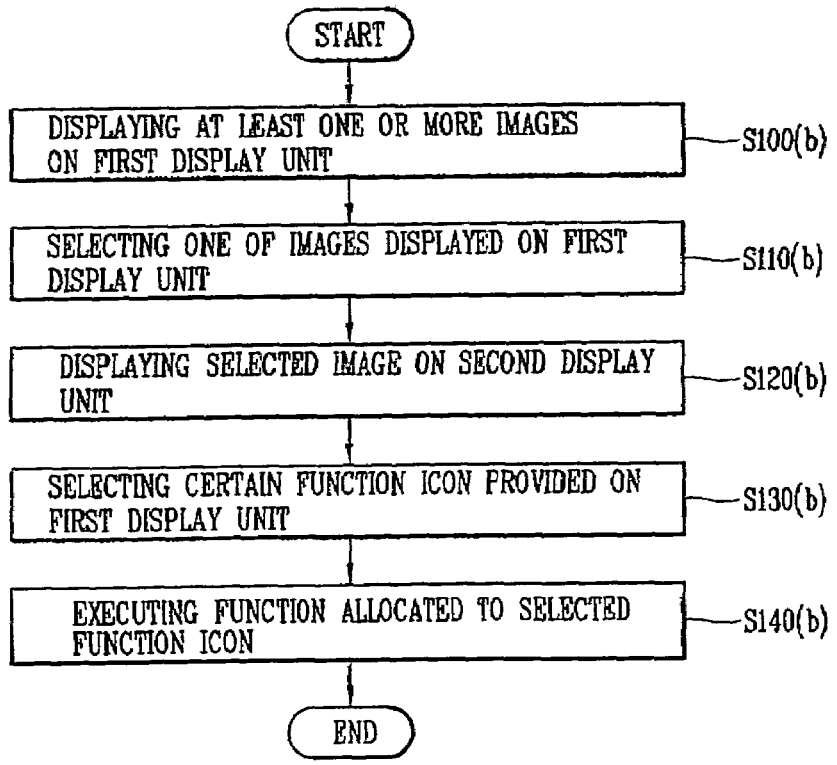

FIG. 1b is a flow chart illustrating the processes of a method for editing an image in an image editing mode using the mobile terminal with the dual-display unit according to the first exemplary embodiment of the present invention.

The method for editing an image by using the mobile terminal with the dual-display unit according to the first exemplary embodiment of the present invention will now be described.

In the present invention, the mobile terminal includes first and second display units for displaying various information. Preferably, at least one of the first and second display units includes a touch screen as a user interface.

First, at least one or more images are displayed on the first display unit (step S100b). Herein, because the image display process is generally performed, a detailed description of it will be omitted. The characteristic part related to the image display process of the present invention, if any, is that, in displaying an image on the first display unit, one image can be displayed, and preferably, a plurality of images can be displayed in a thumbnail type.

The image can be an image which has been stored in the memory of the terminal, captured through the camera of the mobile terminal, or received from outside through a wireless communication module (i.e., stored movie file, a streaming video file, etc.).

Next, when one of the images displayed on the first display is selected (step S110b), the selected image is displayed on the second display unit (step S120b). Preferably, the image selection is performed through the touch screen included in the first display unit. Namely, the user can select the image by using a finger or a stylus pen. As a matter of fact, the user also can select the image through a user input unit such as a key input unit, etc. provided in the mobile terminal.

There can be various methods for selecting and displaying the selected image on the second display unit.

Details examples are as follows.

In a first method, the user can select an image on the first display unit by using the finger or the stylus pen and drag it to the second display unit to display it on the second display unit. Herein, in case where the first and second display units are physically separated, the finger or the stylus pen may contact on the first display unit, be released therefrom, and start to contact on the second display unit, then the terminal may recognize it as a command for displaying the selected image. In this case, both the first and second display unit should include the touch screen.

In a second method, in case where a contact on the first display unit is maintained for a certain distance or longer, the selected image can be displayed on the second display unit. That is, when the finger or the stylus pen may start to contact from a portion where an image desired to be selected is positioned on a surface of the touch screen provided at the first display unit, and the contact is maintained as long as a certain distance within a certain limited time in the direction of the second display unit, the selected image can be displayed on the second display unit. In this method, only the first display unit can have the touch screen. The limited time can be set by the user.

In a third method, when a contact on the first display unit is maintained at a certain pressure or stronger, the selected image can be displayed on the second display unit. That is, when the finger or the stylus pen may start to contact from a portion where an image desired to be selected is positioned on a surface of the touch screen provided at the first display unit, and the contact is maintained at a certain pressure or stronger within a certain limited time in the direction of the second display unit, the selected image can be displayed on the second display unit. In this method, only the first display unit can have the touch screen. The limited time can be set by the user.

In a fourth method, when an image desired to be selected by using the finger or the stylus pen is contacted one time or twice within a certain time interval, the selected image can be displayed on the second display unit.

Thereafter, when a certain function icon provided on the first display unit is selected (step S130b), a function allocated to the function icon is executed (step S140b). The selecting of the function icon can be made through the touch screen of the first display unit like the selection of the image.

The image capturing mode and the image editing mode, two types of modes of the mobile terminal according to the present invention, will be described in detail as follows.

Figure 2:
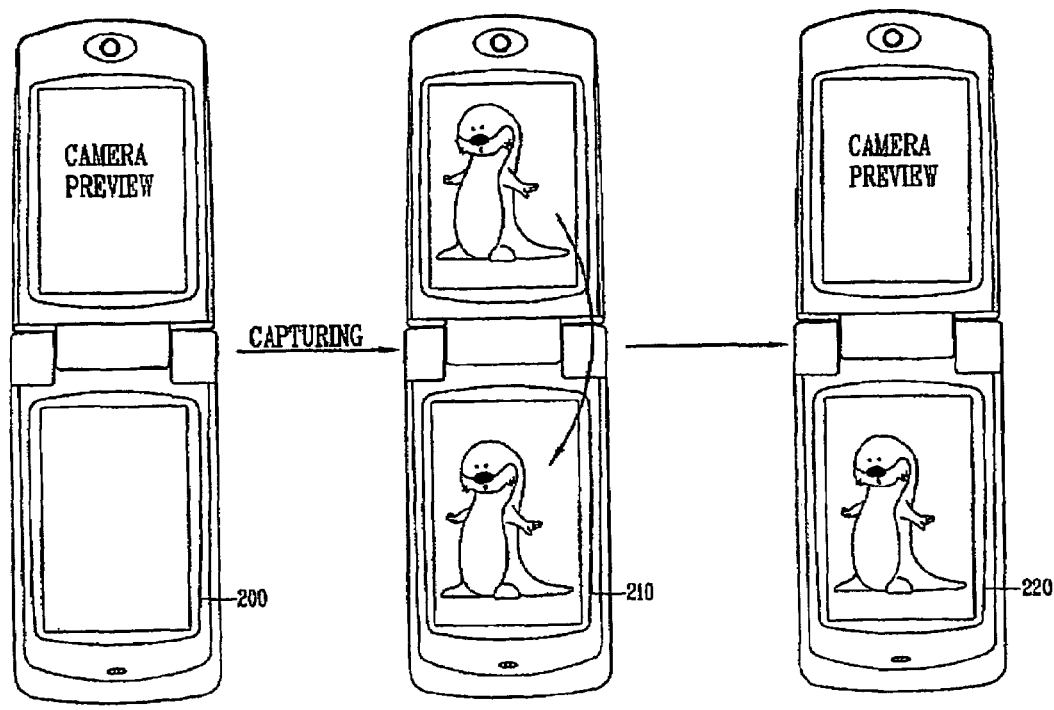
FIG. 2 is a view showing examples of a mobile terminal displaying recently captured images on a second display unit according to the first embodiment of the present invention.
Figure 2:
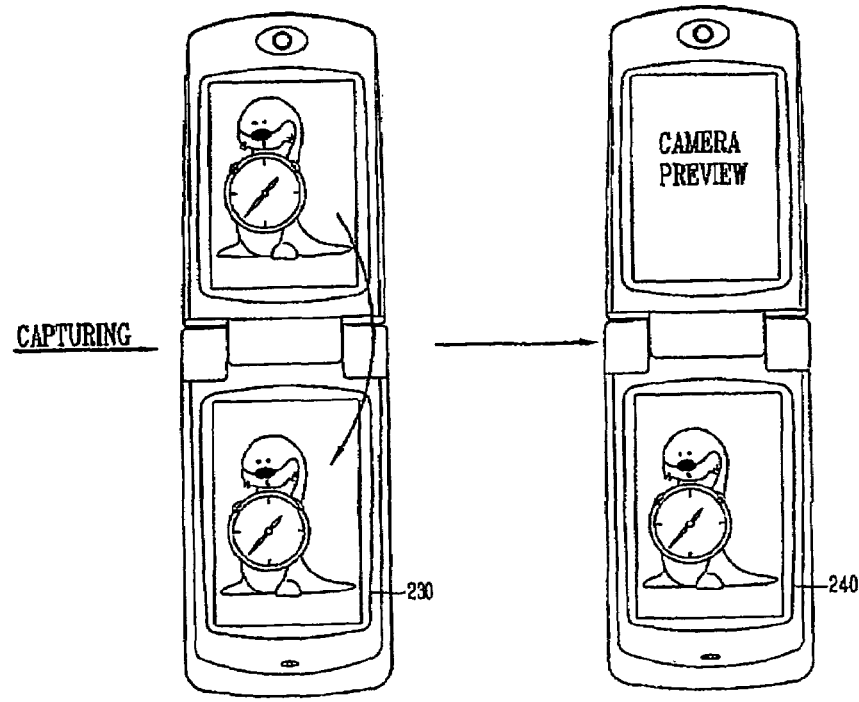

FIG. 2 shows examples of the mobile terminal displaying recently captured images according to the first embodiment of the present invention. Herein, it is assumed that the first display unit is positioned at an upper portion of the terminal and the second display unit is positioned at a lower portion of the terminal. The positions of the first and second display units of the mobile terminal can vary.

In the image capturing mode of the mobile terminal, a camera preview is carried out on the first display unit, which displays an image of the subject obtained in real time (200). Thereafter, when a still image of the subject is captured at a certain instant as an image capture command signal is received from the user, the captured still image is displayed on the second display unit (210). And then, when the user enters the camera preview mode (220) and captures an image again, the captured still image of the subject is displayed (230).

Thereafter, the user enters the camera preview mode again (240). Through this process, the user can capture the moment the image is captured while viewing the still image of the subject obtained in real time through the first display unit, and can look at the most recently captured still image through the second display unit.

Figure 3:
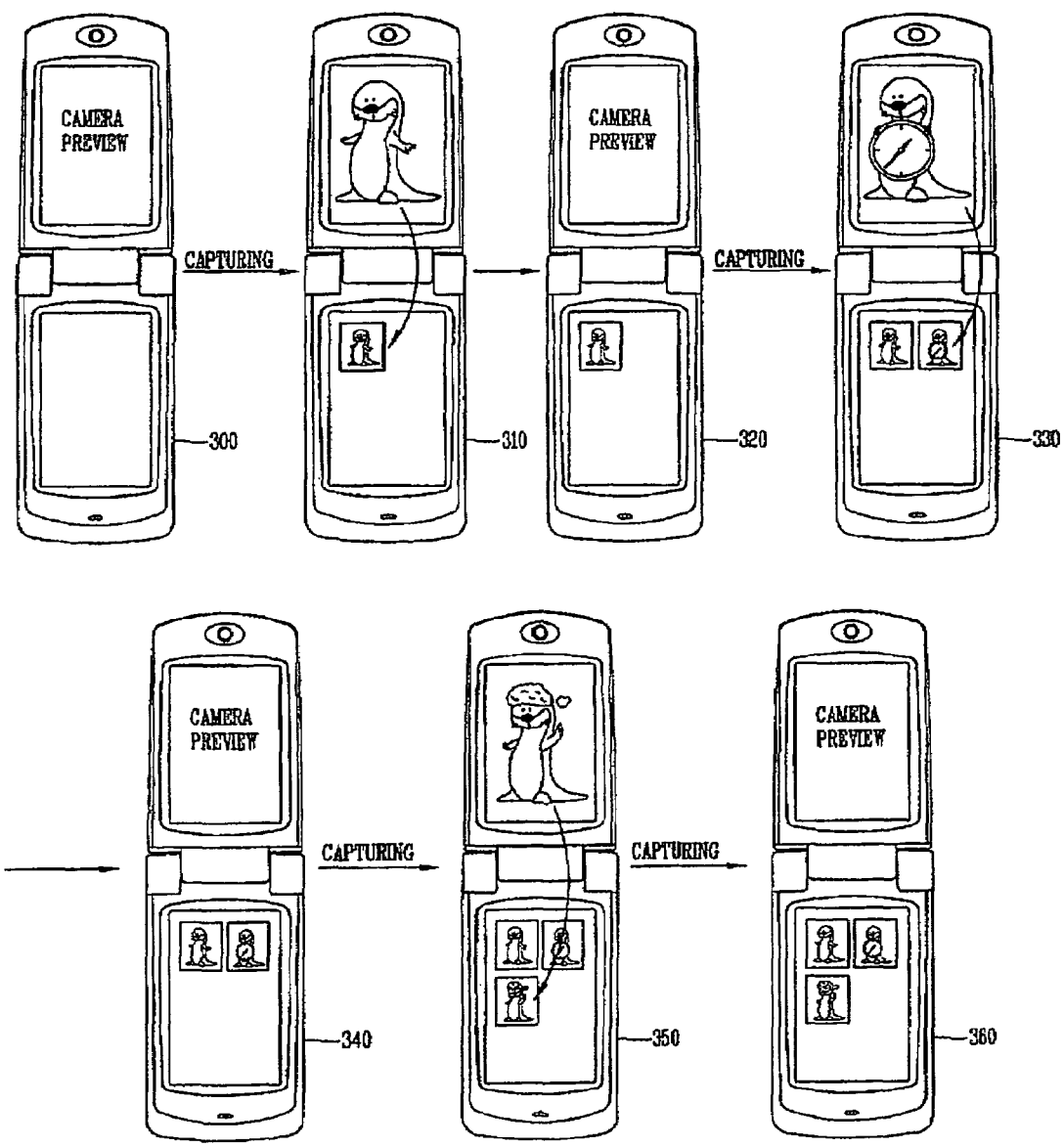
FIG. 3 is a view showing examples of a mobile terminal displaying captured images in a thumb-nail type on the second display unit.

FIG. 3 shows an example of the mobile terminal displaying captured images in a thumbnail type on the second display unit according to the first embodiment of the present invention. The first and second displays are assumed in the same manner as described above.

Likewise as in FIG. 2, when the user captures an image of a subject by pressing the image capture button of the camera in the camera preview mode (300), the captured image is displayed on the second display unit (310). Thereafter, when the user re-enters the camera preview mode (320) to capture an image, the newly captured image is displayed together with the previously captured image on the second display unit (330). By repeatedly performing this process (340, 350 and 360), the user can capture the moment the image is captured while viewing the still image of the subject obtained in real time through the first display unit, and can check the plurality of captured images at one time through the second display unit.

Figure 4:
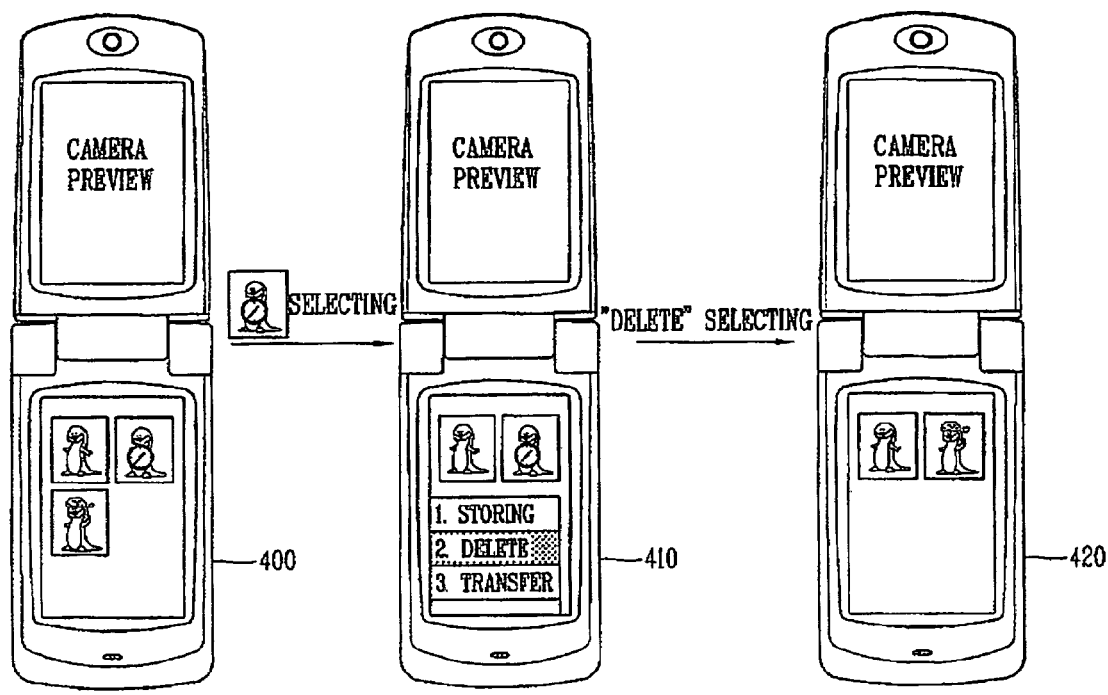
FIG. 4 is a view showing an example of executing an image editing function according to a second embodiment of the present invention.

FIG. 4 is a view showing an example of executing an image editing function according to a second embodiment of the present invention.

The method for dually displaying a captured image by using a mobile terminal according to the second embodiment of the present invention will be described with reference to FIG. 4.

In addition to the first embodiment of the present invention, a process of managing the still images displayed on the second display unit can be performed, which will be described in detail as follows.

First, at least one of the still images displayed on the second display unit is selected (step S400). When the still images are displayed in the thumbnail type, one of the still images can be selected, and when only the most recently captured still image is displayed, only the corresponding still image can be selected.

Herein, the still images can be selected in various manners. For example, when the still images are displayed in the thumbnail type, the user can select one or more still images with the finger or the stylus pen by using the touch screen (or a touch pad) provided at the second display unit. In this case, also the user may select a still image through other user input unit such as the key input unit of the mobile terminal.

Thereafter, a menu for managing the still image is provided (step S410). The menu can have various functions such as a function of storing the selected still image in a folder, storing the still image, or transmitting it through outside through a mobile communication network. The transmission of the image to an external device can be achieved by connecting the mobile terminal via a wired/wireless interface. Herein, the wired interface may be a USB cable or a different data connection line, and the wireless interface can be achieved via Wi-Fi, Wi-MAX, Wi-BRO, a wireless broadband connection, or other types of technology that can handle transmission of information at a high speed.

Herein, a function icon used for the image editing mode and a function allocated to the function icon can vary, and the functions allocated to the function icons can include an image editing function, an image magnifying function, and the like.

Characteristics of the function icons and functions allocated thereto will be described in detail as follows.

(1) Image Editing Function:

The function icon is an icon for indicating an image editing, and the function can provide various editing tools for editing the selected image, whereby the user can variably edit the image.

Figure 5:
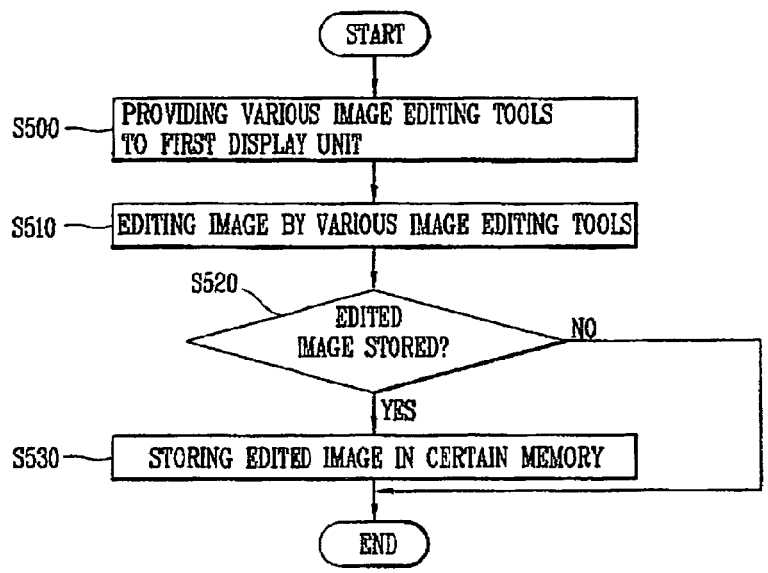
FIG. 5 is a flow chart illustrating the processes of a method for dually displaying captured images using a mobile terminal according to the second embodiment of the present invention.

FIG. 5 is a flow chart illustrating the processes of a method for dually displaying captured images using a mobile terminal according to the second embodiment of the present invention.

First, various image editing tools are provided on the first display unit (S500). The selected image is edited according to an image editing tool select signal received from the user (step S510). Thereafter, the edited image is stored in a certain memory according to a user selection (steps S520 and S530).

Figure 6:
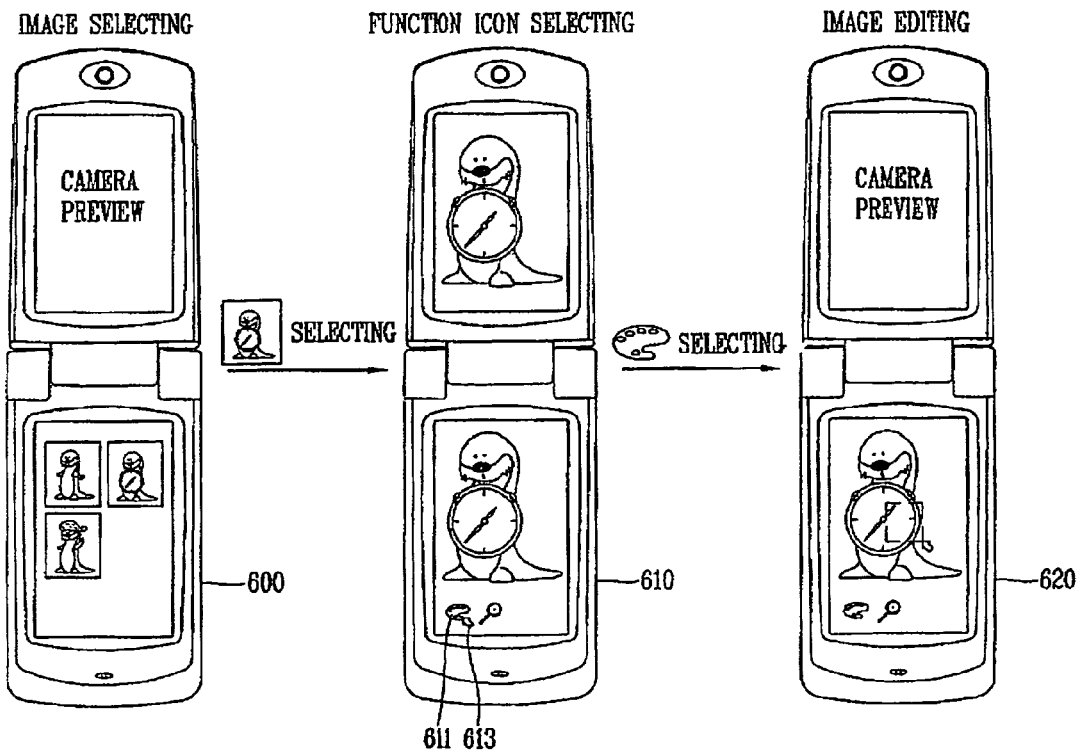
FIG. 6 is a view showing examples of a screen of the mobile terminal on which an image editing function is being executed according to the present invention.

FIG. 6 is a view showing examples of a screen of the mobile terminal on which an image editing function is being executed according to the present invention. A display denoted by reference numeral 600 shows three images in a thumbnail type displayed on the first display unit. When a particular image is selected, the selected image is displayed on the second display unit and various function icons are provided on the first display unit 610. Herein, reference numeral 611 denotes a function icon for an image editing, and 613 denotes a pointer or an indicator for selecting the function icon. The user can move the pointer or the indicator 613 by having his/her finger or the stylus pen contact on the touch screen provided on the first display unit. Reference numeral 620 shows an example of a screen for editing the selected. Herein, various image editing tools (not shown) such as an editing tool or a copying tool can be provided. Accordingly, the user can edit the original image (namely, selected image) on the first display unit while looking at the original image displayed on the second display unit.

(2) Image Magnifying Function:

The function icon can be an icon for magnifying an image, and the function can be a function of magnifying the selected image and displaying it.

Figure 7:
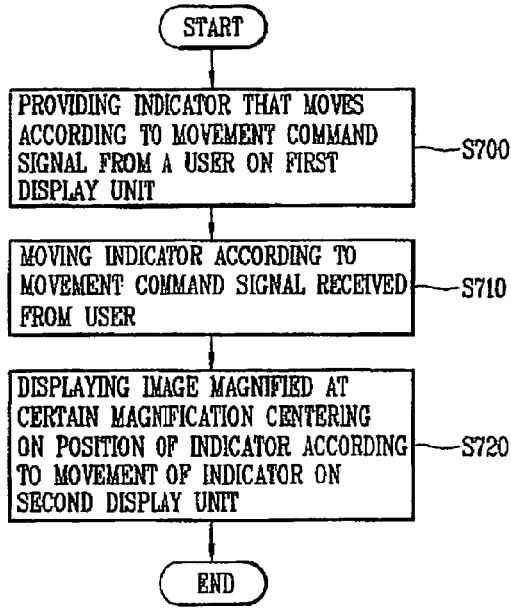
FIG. 7 is a view showing examples of a method for executing an image magnifying function according to the present invention.

FIG. 7 is a view showing examples of a method for executing an image magnifying function according to the present invention.

First, a point or an indicator that moves according to a movement command signal received from the user is provided on the first display unit (step S700). An image magnified at a certain magnification centering on a position of the indicator according to a movement of the pointer or the indicator is displayed on the second display unit (steps S710 and S720).

Figure 8:
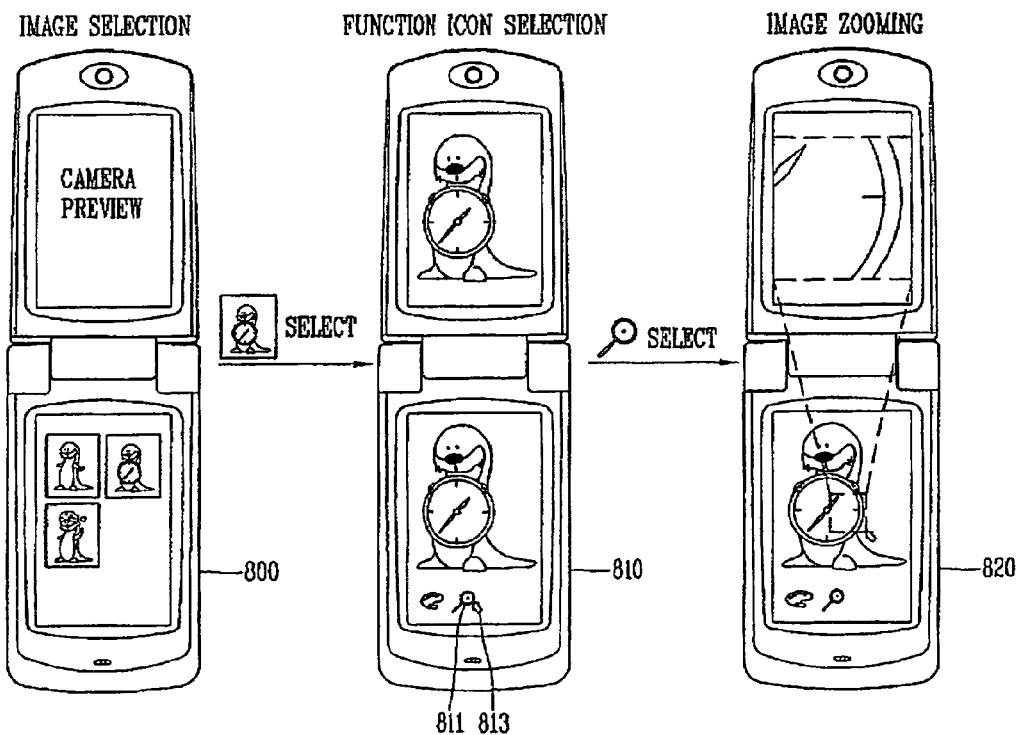
FIG. 8 is a flow chart illustrating the processes of a method for executing the image magnifying function according to the present invention.

FIG. 8 is a flow chart illustrating the processes of a method for executing the image magnifying function according to the present invention. A display denoted by reference numeral 800 shows three images in a thumbnail type displayed on the first display unit. When a particular image is selected, the selected image is displayed on the second display unit and various function icons are provided on the first display unit 810. Herein, reference numeral 811 denotes a function icon for an image editing, and 813 denotes a pointer or an indicator for selecting the function icon. Reference numeral 820 denotes an example of how a particular portion of the selected image is magnified at a certain magnification and displayed on the second display unit.

Figure 9:
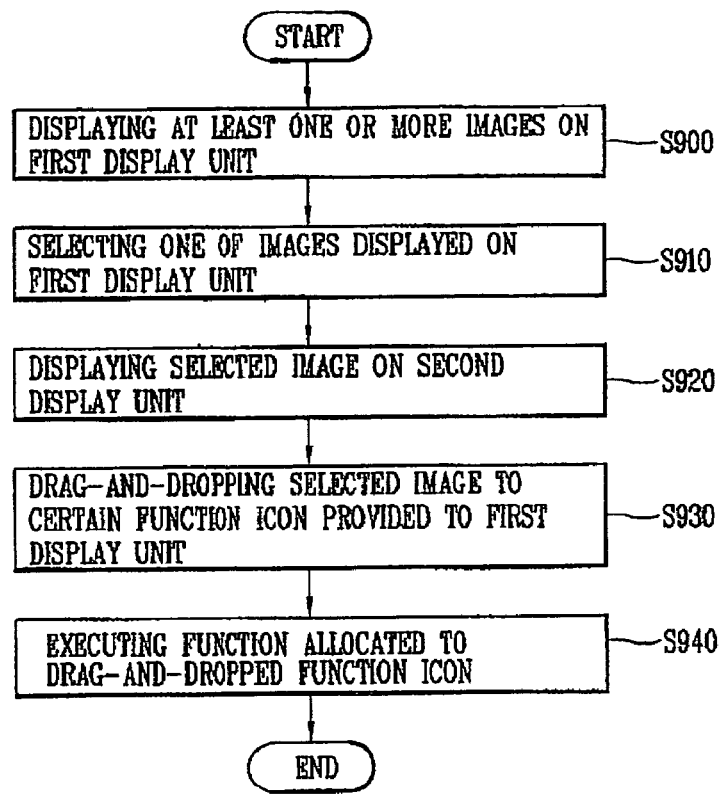
FIG. 9 is a flow chart illustrating the processes of a method for editing an image by using a mobile terminal with a dual-display unit according to a third embodiment of the present invention.

FIG. 9 is a flow chart illustrating the processes of a method for editing an image by using a mobile terminal with a dual-display unit according to a third embodiment of the present invention.

The method for editing an image by using a mobile communication terminal with a dual-display unit according to the third embodiment of the present invention will now be described in detail.

The mobile terminal according to the third embodiment of the present invention includes first and second display units for displaying various information. Preferably, at least one of the first and second display units includes a touch screen as a user interface.

First, at least one or more images are displayed on the first display unit (step S900). Characteristics of the image(s) and displaying of the image(s) are the same as those described above.

Nest, when one of the images displayed on the first display unit is selected (step S910), the selected image is displayed on the second display unit (step S920). Detailed characteristics regarding the image selection are the same as those described above, except that the image can be displayed immediately when it is selected.

Thereafter, when the selected image is drag-and-dropped to a certain function icon provided on the first display unit (step S930), a function allocated to the drag-and-dropped function icon is executed (step S940). Herein, detailed characteristics of the function icon and its function allocated thereto are the same as those described above. The drag-and-dropping can be made by using the touch screen of the first display unit. Namely, the user can let his/her finger or the stylus pen contact a portion of a surface of the touch screen of the first display unit corresponding to an image desired to be selected (image selection), and in this state, the user moves his/her finger or the stylus pen to the function icon to be selected. The selected image can be moved together along a locus along which the finger or the stylus pen moves. When the moved finger or the stylus pen is let go off above the function icon, a function icon positioned at the corresponding portion is selected (function icon selection).

Figure 10:
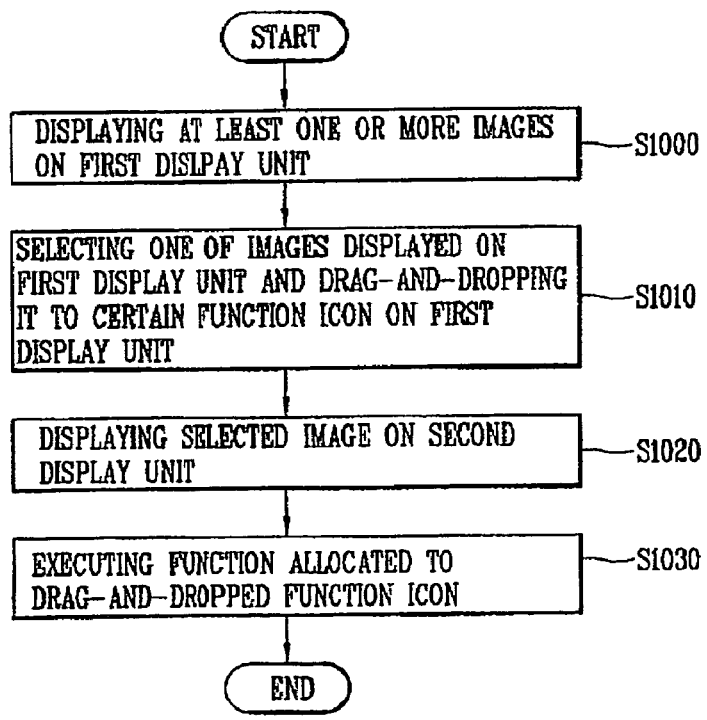
FIG. 10 is a flow chart illustrating the processes of a method for editing an image by using a mobile terminal with a dual-display unit according to a fourth embodiment of the present invention.

FIG. 10 is a flow chart illustrating the processes of a method for editing an image by using the mobile terminal with a dual-display unit according to a fourth embodiment of the present invention.

The method for editing an image by using the mobile terminal with a dual-display unit according to fourth embodiment of the present invention will now be described with reference to FIG. 10.

Likewise as in the first, second and third embodiments of the present invention, the mobile terminal includes first and second display units for displaying various information.

In addition, at least one of the first and second display units includes a touch screen as a user interface.

First, at least one or more images are displayed on the first display unit (step S1000). Detailed characteristics of the image and the image displaying are the same as those described above.

When one of the images displayed on the first display unit is selected and drag-and-dropped to a certain function icon provided on the first display unit (step S1010), the selected image is displayed on the second display unit (step S1020) and a function allocated to the drag-and-dropped function icon is executed (step S1030). Detailed characteristics of the image section, the function icon and its function, and the drag-and-dropping are the same as those described above, except that, in the step S1020, the selected image can be displayed immediately when it is drag-and-dropped to the certain function icon.

Figure 11:
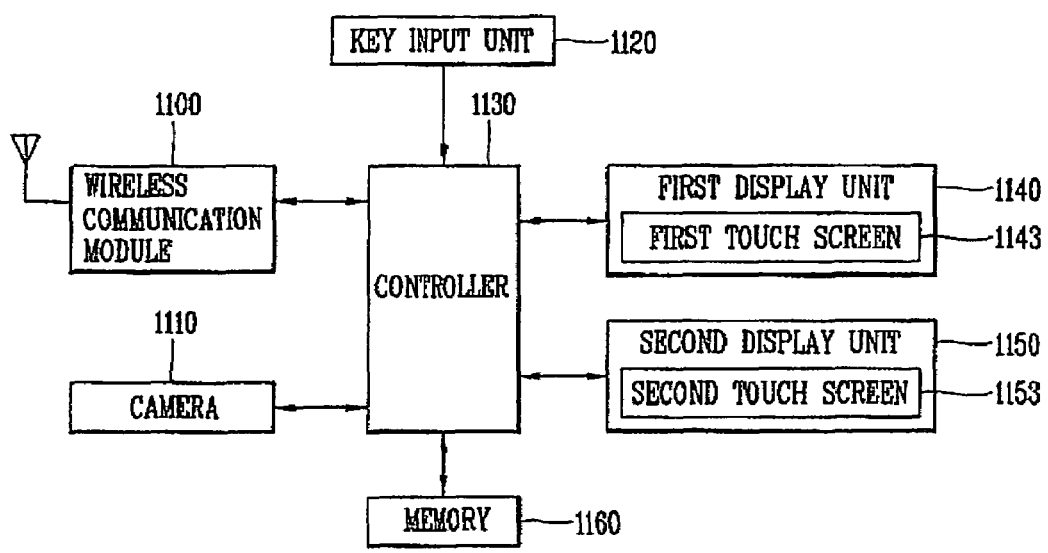
FIG. 11 is a schematic block diagram of a mobile terminal with a dual-display unit having a dual-display unit having an image editing function according to a fifth embodiment of the present invention.

A mobile terminal with a dual-display unit having an image editing function according to a fifth embodiment of the present invention will be described with reference to FIG. 11.

The mobile terminal according to the fifth embodiment of the present invention includes a wireless communication module 1100, a camera 1110, a key input unit 1020, a controller 1130, a first display unit 1140, a second display unit 1150 and a memory 1160. The first and second display units 1140 and 1150 may include touch screens 1143 and 1153 as user interfaces in addition to the key input unit 1120. The key input unit 1120 is an input unit including various keys for receiving various command signals from a user.

The first display unit 1140 displays at least one or more images. A detailed structure for the first display unit 1140 to display an image is not a part of the feature of the present invention, a description of it will now thus omitted. In this respect, however, the image can be received from an external device through the wireless communication module 1100, obtained by the camera 1110, and stored in the memory 1160 through a certain path.

In an image capturing mode, a first control signal for displaying an image of a subject received through the camera 1110 is outputted.

The first display unit 1140 displays the image of the subject in real time according to the first control signal.

When the controller 1130 receives an image capturing signal from the key input unit 1120, the controller 1130 outputs a second control signal for displaying a still image of the subject captured by the camera 1110 and outputs a third control signal for storing the captured still image in the memory 1160 according to a user selection.

The second display unit 1150 displays the captured still image according to the second control signal and the memory 1160 stores the captured still image according to the third control signal.

Herein, the second control signal is for displaying the most recently captured still image or for displaying still images in a thumbnail type in the image capture order, according to a pre-set option.

In addition, when a select command signal for selecting at least one or more of the still images displayed on the second display unit 1150 is received from the user in the image editing mode, the controller 1130 can provide a menu for managing the displayed still images. Preferably, the menu can be provided on the second display unit 1150. Herein, the selection of the still image can be made through the second touch screen 1153.

In addition, when a select command signal for selecting at least one of the functions provided by the menu is received, the controller 1130 outputs a fourth control signal for performing the function. Herein, the function selection can be made through the second touch screen 1153. In addition, detailed characteristics of the function are the same as those described above. Transmission of the image to an external device can be made through the wireless communication module 1110. In addition, the controller 1130 receives a select signal with respect to one of the images displayed on the first display unit and output a fifth control signal for displaying the selected image. The image selection can be made through the first touch screen 1143 of the first display unit, and other detailed characteristics are the same as those described above. As a matter of course, the image selection can be also made through the key input unit 1120. The second display unit 1150 displays the selected image according to the fifth control signal. In addition, the controller 1130 provides a certain function icon on the first display unit, and when a select signal with respect to the function icon is received, the controller 1130 may output a sixth control signal for executing a function allocated to the selected function icon. The function icon selection can be made through the first touch screen 1143. Detailed characteristics of the function icon and its function are the same as those described above. The edited image or enlarged image can be stored in the memory 1160.

Here, the implementation of different features [e.g. 'virtual key pad', 'virtual arrow icon' ] into the first and second touch-screen may perform various functions to manipulate the images though the present invention's mobile communication terminal. Also, various type of memory means, such as RAMs, ROMs, hard disk type memories, Flash memories, GRAM (graphic random access memory), SGAM (synchronous graphic random access memory), etc, can also be applied to store the edited or zoomed image for different types of image data [e.g., SMS (short Message Service), MMS (multimedia message service), Graphic message, DMB (digital multimedia broadcasting), etc], The selecting of functional icon can be executed by said input device (1220), which may provide with audible, visual, and/or tactile input manner.

Namely, the function icon can be an icon that indicates image editing, and the sixth control signal may be for providing various editing tools for editing the selected image to the first display unit and editing the selected image according to an image editing tool select signal received from the user.

The function icon can be an icon that indicates image magnifying, and the sixth control signal may be for providing an indicator that moves according to a movement command signal received from the user to the first display unit and displaying an image which has been magnified at certain magnification centering on a position of the indicator according to the movement of the indicator.

The first display unit 1140 displays at least one or more images. Detailed characteristics of the image(s) are the same as those described above.

When one of the images displayed on the first display unit is selected and drag-and-dropped to a certain function icon provided on the first display unit 1150, the controller 1130 outputs a seventh control signal for displaying the selected image on the second display unit 1150 and an eighth control signal for executing a function allocated to the drag-and-dropped function icon. The drag-and-dropping, the function icon, the function allocated thereto and other characteristics required for a detailed structure of a sixth embodiment of the present invention are the same as those described above, so a description therefore will be thus omitted.

In the sixth embodiment of the present invention, differently, the seventh control signal may be provided to display the selected image on the second display unit 1150 immediately when it is selected, and to display the selected image on the second display unit 1150 immediately when it is drag-and-dropped to the certain function icon.

The second display unit 1150 displays the selected image according to the seventh control signal.

Various modifications of the present invention can also be applied based upon the basic concept of the presented invention.

Usually, due to the particular characteristics of a mobile communication terminal, various aspects, such as mobility, limited processor capabilities, restricted memory size, restrictions on battery power consumption, a relatively small-sized display screen, etc., need to be considered when implementing the present invention with consideration of a balance of all these aspects mentioned above.

As to the limited capability of memory in mobile communication terminal, it can be understood that the amount of edited image file size being stored or display attributes [e.g. resolution] representing the edited image may need to be restricted. It is also required to restrict numbers of thumbnails or image editing functional icons shown in display screen because of the limited size of the display screen in mobile communication terminal. For example, one can not able to recognize the images properly when large number of thumbnails shown in small-sized display screen of mobile communication terminal. Also, due to the limitation of size of the display screen mounted in the mobile terminal. It can be understood that a terminal with a single display screen, which divides the single display screen into more than two portions, could perform equivalent function of the presented invention's dual display mobile communication terminal, as such the real-time scene through capturing device could shown in a first portion of display screen and the captured image from the user selection could shown in other portion of display screen. Furthermore, it can also be understood that the display screen could have at least two or more display screens.

It can be understood that various image processing functions (not just image editing or image zooming) can be applicable to the present invention, such as image manipulation, image modification, image composition, etc. And, such image processing functions may perform automatically without user's intervention during image editing mode. Further, not just still image but many different types of image (e.g., still images, video clips, animation or other moving image) can be captured and modified by terminal for achieving a desired user interface of image editing effect.

It can be understood that the feature in present invention may be implemented in hardware, software, and/or a combination thereof. The present invention may be implemented within the terminal itself or some may be implemented with external device (e.g. cradle). It may be beneficial to have some of image editing process be performed externally in order to minimize the burden on the terminal. Various types of wired and/or wireless interfaces may be employed to communicate between the terminal and the external device.

The foregoing embodiments and advantages, which explained with figures, are merely exemplary and are not to be construed as limiting the present invention in one skilled in the ordinary art. The description of the present invention is intended to be illustrative, and not to limit the scope of the claims. Many alternatives, modifications, and variations will be apparent to those skilled in the art.

As so far described, the mobile terminal with the function of dually displaying and editing a captured image and its method according to the present invention has many advantages.

That is, for example, first, the image of the camera preview and the captured image are displayed on each different display unit, so the user can capture a moment an image is to be captured and check the recently captured image by naked eyes, enhancing user convenience and providing fun to users.

Second, because a display of the original image and a display for editing or magnifying the original image are implemented on each different display unit, the user can edit or magnify the original image while comparing the image under editing and magnifying with its original form.

Third, because the touch screen as the user interface is mounted in each display unit, the user can conveniently edit or display the image without having to user the key input unit.

What is claimed is:

1. A method for dual-displaying captured images by using a mobile terminal having a camera, wherein a first display portion among first and second display portions provided in the mobile terminal displays a real-time image of an object received through the camera and, at the same time, the second display portion displays a still image of an object captured according to an image capture command signal received from a user, wherein the still image of the object captured is displayed on the second display portion in response to the image capture command signal received from the user that includes a first touching of the first display portion and a dragging operation on the first display portion towards a direction of the second display portion.

2. A method for dual-displaying a captured image by using a mobile terminal having a camera, the method comprising:
   (a) displaying an image of an object received through the camera on a first display portion among first and second display portions provided in the terminal in real time;
   (b) obtaining a captured still image of the object according to an image capture command signal received from a user and storing the captured still image in a memory; and
   (c) displaying the captured still image on the second display portion according to a display command signal received from the user,
   wherein the image capture command signal received from the user includes a first touching of the first display portion and the display command signal received from the user includes a dragging operation on the first display portion towards a direction of the second display portion.

3. The method of claim 2, wherein, in the step (c), still images captured in the step (b) are displayed in a thumbnail format in the image capture order according to a pre-set option.

4. The method of claim 2, wherein, in the step (c), the latest captured still image in the step (b) is displayed according to a pre-set option.

5. The method of any one of claims 1 to 4, wherein one or more of the first and second display portions comprise a touch screen as a user interface.

6. The method of claim 3 or 4, further comprising:
   (d) managing respective still images displayed on the second display portion.

7. The method of claim 6, wherein the step (d) comprises:
   selecting one or more still images displayed on the second display portion;
   providing a menu for managing the displayed still images; and
   selectively executing one of functions provided by the menu.

8. The method of claim 7, wherein the menu has a function of storing the selected still image in a different folder.

9. The method of claim 7, wherein the menu has a function of deleting the selected still image.

10. The method of claim 7, wherein the menu has a function of transmitting the selected still image to outside through a mobile communication network.

11. The method of claim 7, wherein the second display portion comprises a touch screen as a user interface, and the still image selection and the function selection in the step (d) are performed by using the touch screen.

12. A mobile terminal having a camera, the mobile terminal comprising:
   a key input unit that receives various commands from a user;
   a controller that outputs a first control signal to display a realtime image of an object received through the camera and a second control signal to display a still image of the object captured upon receiving an image capture command signal from the key input unit;
   a first display portion that displays the real time image of the object according to the first control signal; and
   a second display portion that displays the still image according to the second control signal,
   wherein the first control signal includes a first touching of the first display portion and the second control signal includes a dragging operation on the first display portion towards a direction of the second display portion.

13. The mobile terminal of claim 12, wherein the second control signal is further to display still images in a thumbnail format in the captured order according to a pre-set option.

14. The mobile terminal of claim 12, wherein the second control signal is further to display a still image which has been captured most recently according to a pre-set option.

15. The mobile terminal of any one of claims 13 and 14, wherein one or more of the first and second display portions comprise a touch screen as a user interface in addition to the key input unit.

16. The mobile terminal of claim 13 or 14, further comprising:
   a memory unit that stores the captured still image,
   wherein the controller performs an operation of outputting a third control signal to store the captured still image in a memory unit.

17. The mobile terminal of claim 16, wherein when a select command signal with respect one or more of the still images displayed on the second display portion is received from the user, the controller provides a menu for managing the displayed still image, and when a select command signal with respect to one of functions provided by a menu is received from the user, the controller performs an operation of outputting a fourth control signal.

18. The mobile terminal of claim 17, wherein the second display portion comprises a touch screen as a user interface separately from the key input unit, and the still image selection and the function selection are performed by using the touch screen.

19. The mobile terminal of claim 17, wherein the menu is provided on the second display portion.

20. The mobile terminal of claim 17, wherein the menu has a function of storing the selected still image in a different folder of the memory unit.

21. The mobile terminal of claim 17, wherein the menu has a function of deleting the selected still image from the memory unit.

22. The mobile terminal of claim 17, wherein the menu has a function of transmitting the selected still image through a wireless communication module.

23. A method for dual-displaying captured images by using a mobile terminal having a camera, the method comprising:
   displaying, on a first display portion among first and second display portions provided in the mobile terminal, a real-time image of an object received through the camera and, at the same time, displaying, on the second display portion, at least one still image of an object captured according to an image capture command signal received from a user,
   wherein captured still images are displayed in a thumbnail format in the image capture order according to a display command signal and a pre-set option, and
   wherein the image capture command signal received from the user includes a first touching of the first display portion and the display command signal includes a dragging operation on the first display portion towards a direction of the second display portion.

* * * * *